United States Patent [19]

Lynch et al.

[11] 4,364,701
[45] Dec. 21, 1982

[54] COMBINED HAY BALE TRANSPORTING AND UNROLLING MECHANISM

[76] Inventors: Bobby R. Lynch; Robert L. Lynch, both of R.R. #2, Box 57, Ozark, Mo. 65721

[21] Appl. No.: 212,838

[22] Filed: Dec. 4, 1980

[51] Int. Cl.³ ............................................ A01D 87/12
[52] U.S. Cl. .............................. 414/24.6; 242/86.5 R; 414/911; 414/912
[58] Field of Search .................... 414/24.5, 24.6, 684, 414/911, 912; 242/86.5 R, 86.52

[56] References Cited

U.S. PATENT DOCUMENTS

| | | | |
|---|---|---|---|
| 3,632,054 | 1/1972 | Heppelmann et al. | 414/24.6 X |
| 4,008,862 | 2/1977 | Wilmes | 414/24.6 |
| 4,084,708 | 4/1978 | Goodvin | 414/24.6 |
| 4,090,624 | 5/1978 | Krein et al. | 424/911 X |
| 4,154,349 | 5/1979 | Christensen | 414/685 X |
| 4,288,191 | 9/1981 | Lynch | 414/24.5 |

FOREIGN PATENT DOCUMENTS 1114180 5/1968 United Kingdom ............. 242/86.52

OTHER PUBLICATIONS

Gold'N Spike Bale Carriers, Gold'N Industries, Green City, Mo., 11/12/1976.

*Primary Examiner*—Leslie J. Paperner
*Attorney, Agent, or Firm*—Edward J. Holler

[57] ABSTRACT

This invention relates to a combined vehicle-mounted carrier and dispenser for a cylindrical hay bale of substantial size and weight. An elongated finger-support member is pivotally mounted on the bed of a pick-up truck, a tractor hitch or other vehicle. The finger support member is T-shaped to retain a plurality of movable support fingers in cantilevered relation to penetrate and engage the bale. The finger support member is pivotally attached to a base member which is mounted on the truck bed. A power winch is located on said base member having a cable connected to the free end of the central arm member of the T-shaped finger support member. Tensioning means comprising a pair of aligned leaf springs is mounted between said pivotal finger support member and said fixed base member to maintain continuous tension on the cable and thus prevent any loose unwinding or unraveling of the cable on the power winch. The leaf springs further function to assist positive control of pivotal movement of the finger support member between its lowered and raised positions, both when loaded and unloaded. The mechanism includes a pair of similar U-shaped arm members with each arm having coaxially aligned pivotal leg portions and pointed tip leg portions adapted to axially penetrate the bale for its unrolling upon delivery to a feeding location.

15 Claims, 8 Drawing Figures

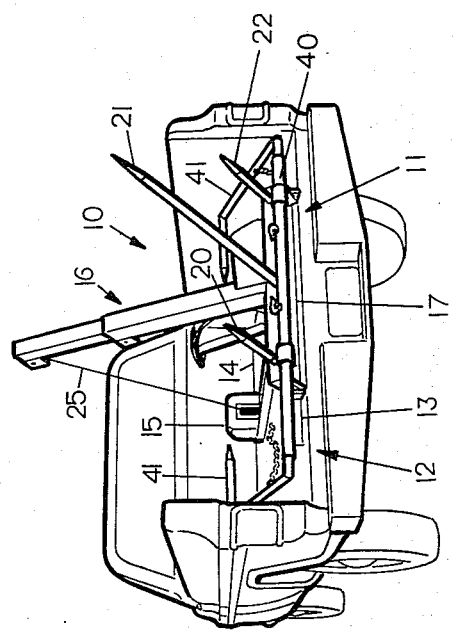
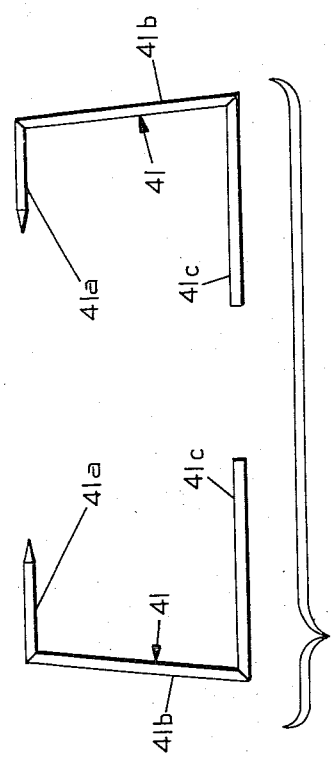
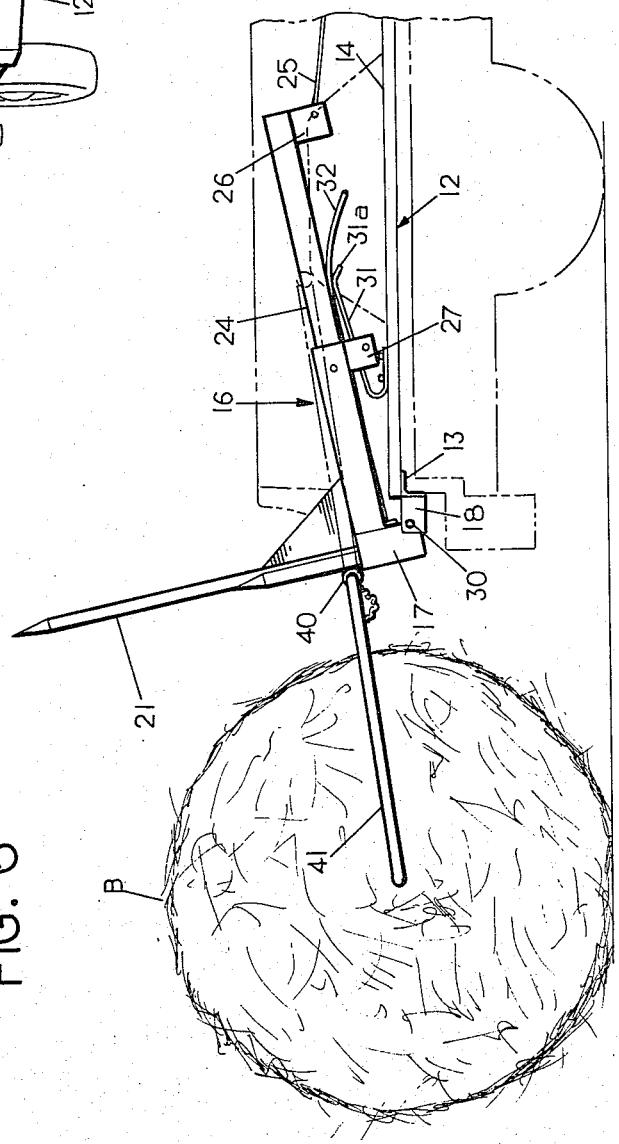
FIG. 1
FIG. 6
FIG. 5

COMBINED HAY BALE TRANSPORTING AND UNROLLING MECHANISM

BACKGROUND OF THE INVENTION

1. Field of the Invention

The present invention relates to handling cylindrical bales and more particularly to a hay bale carrier and dispenser or feeder capable of transporting and unrolling the bales.

2. Description of the Prior Art

The handling of large, heavy hay bales has presented a serious problem for farmers, cattlemen and others growing and feeding hay in large quantities, and this particular problem has been intensified by the recent introduction of farming machinery which commonly produces a large, very heavy cylindrical hay bale. The prior art devices have not fully solved the problem of handling such heavy bales in a simple and economical manner, nor the problem of unrolling all or part of the bales once delivered to a feeding location.

Lift trucks for moving bulky, heavy loads are known in the art as disclosed by U.S. Pat. No. 1,545,417 to Ulinski, U.S. Pat. No. 2,684,164 to Violette, and U.S. Pat. No. 2,698,698 to Smith Et al. A mechanism for lifting carpet rolls is known as disclosed by U.S. Pat. No. 3,705,658 to Harris, and a load handling and engaging device for lift trucks for handling bulk materials is disclosed by U.S. Pat. No. 2,682,350 to Garrett.

The handling of large, round hay bales, which frequently weigh as much as 1 to 1½ tons, and measure from about 5 to 8 feet in length and diameter, has continued to present serious problems. The efficient movement of such bales for storage and feeding purposes has previously required relatively expensive and considerably more complex hydraulic handling equipment.

U.S. Pat. Nos. 4,015,739 to Cox and 4,120,405 to Jones both relate to mechanisms which involve hydraulically-powered means which are attached to tractors for spear-type bale pick-up devices. In either case, such mechanisms may be attached to pick-up trucks, but require power sources.

Other types of apparatus have involved combined bale lifting, hauling and unrolling mechanisms such as disclosed by U.S. Pat. No. 4,084,708 to Goodvin. In this disclosure, the bale lifter and carrier attachment is raised by an electric winch, but the flexible cable frequently becomes snarled and unmanageable. The hay bale handling mechanism disclosed by U.S. Pat. No. 4,015,739 to Cox requires a hydraulic cylinder to effect upward and downward motion of a single bale-supporting elongated finger.

All of the prior art winch devices have a common problem of lowering the empty finger(s) or spike(s) from their vertical position to a horizontal position for bale penetration. Prior to pick-up of the bale, with the empty finger(s) projecting upwardly and the finger support member resting in the bed of the vehicle, most of the weight of the finger support member resides over the bed. When the winch is unwound, there are no forces to push the finger(s) downwardly around the pivot point for projecting into horizontal loading position. Normally, the operator is required to unwind the winch cable, then walk around and physically pull the finger(s) downwardly into horizontal loading position, frequently experiencing cable snarling. Problems of unwinding sufficient cable are obvious. If insufficient cable is unwound, the operator must repeat the unwind and walk around again to pull the finger(s) downwardly. Upon loading and transport of the bale to the desired feeding location, the bale is deposited on the ground for feeding. Previously, it has been difficult to unroll the bale without employing special unrolling equipment separately mounted from the transporting mechanism. The present invention eliminates such problems in a combined bale handling and unrolling mechanism.

SUMMARY OF THE INVENTION

The bale handling and unrolling mechanism of this invention involves an apparatus, which can be rigidly attached to the bed of a pick-up truck or other vehicle, having a plurality of elongated fingers extending rearwardly in horizontal or pick-up position and movable into an upwardly extending relation in its vertical load-carrying position. The bale can be loaded onto the horizontally projecting fingers of the support member by backing the truck, or other vehicle, towards the bale with the elongated fingers penetrating the bale essentially through its axial center, or through the horizontal plane of its axial center, and then pivoting the finger support member angularly upwardly for movement of the bale. The bale is then raised by elevating the elongated load-carrying fingers. The bale is then retained by the array of support fingers pointing essentially vertically for positive bale retention. When unloading is desired, the bale is lowered to rest on a supporting surface, or the ground, and the vehicle is moved away withdrawing the fingers of the mechanism from the bale.

The bale handling and unrolling apparatus mounted on the truck is operated by an electric winch, or a hydraulic cylinder, while the pivotal finger support member and the stationary base member have positive tensioning means mounted therebetween operating on the flexible lift cable. The tensioning means preferably consist of a pair of contoured leaf springs interposed between the base member and the pivotal finger support member which assist in maintaining continuous tension on the lift cable at all times. In the moving or transport position, the support fingers are pivoted forwardly and upwardly to a near vertical position thereby positively maintaining the bale in stationary transport relation within the truck bed sides where it is centrally located. The bed sides serve to further support and retain the bale. When the bale is to be unloaded, it is only necessary to operate the electric winch or hydraulic to move the fingers to the horizontal rearwardly extending position whereby the bale is placed on the ground. The truck is free to drive away, leaving the bale behind. The tensioning means consisting of a pair of aligned contacting leaf springs provides apparatus for assisting in maintaining continuous tension on the flexible lifting cable at all times, thus preventing problems of snarled cable during loading and unloading, and periods therebetween, especially when the empty fingers are to be lowered for use. Thus, the apparatus is ready for immediate use at all times. The combined apparatus provides a pair of pivotally mounted arms which are adapted to penetrate the bale axially, preferably after the mechanism is moved 90° from its unloading position, so that the arms provide unrolling means upon forward movement of the truck or mechanism supporting vehicle.

It is a primary object of the present invention to provide combined apparatus which is fully capable of performing the aforesaid functions of bale transporting and unrolling in an expedient and economical manner. With a flexible lifting cable connected to the finger support member, the leaf springs are adapted to maintain positive tension on the cable for positive control of the lifting fingers, when moved in both upward and downward directions, as well as when the fingers are unloaded or loaded. The combined apparatus includes a pair of U-shaped arm members, each having one leg portion coaxially mounted in telescopic relation for the juxtaposed free leg portions to combinedly penetrate and retain the bale during the unrolling operation.

Further objects are readily attainable as set forth more fully hereinafter, and as illustrated in the accompanying drawings.

BRIEF DESCRIPTION OF THE DRAWINGS

ON THE DRAWINGS

FIG. 1 is a perspective view of the hay bale transporting and unrolling mechanism mounted on the bed of a pick-up truck.

Figure 2:
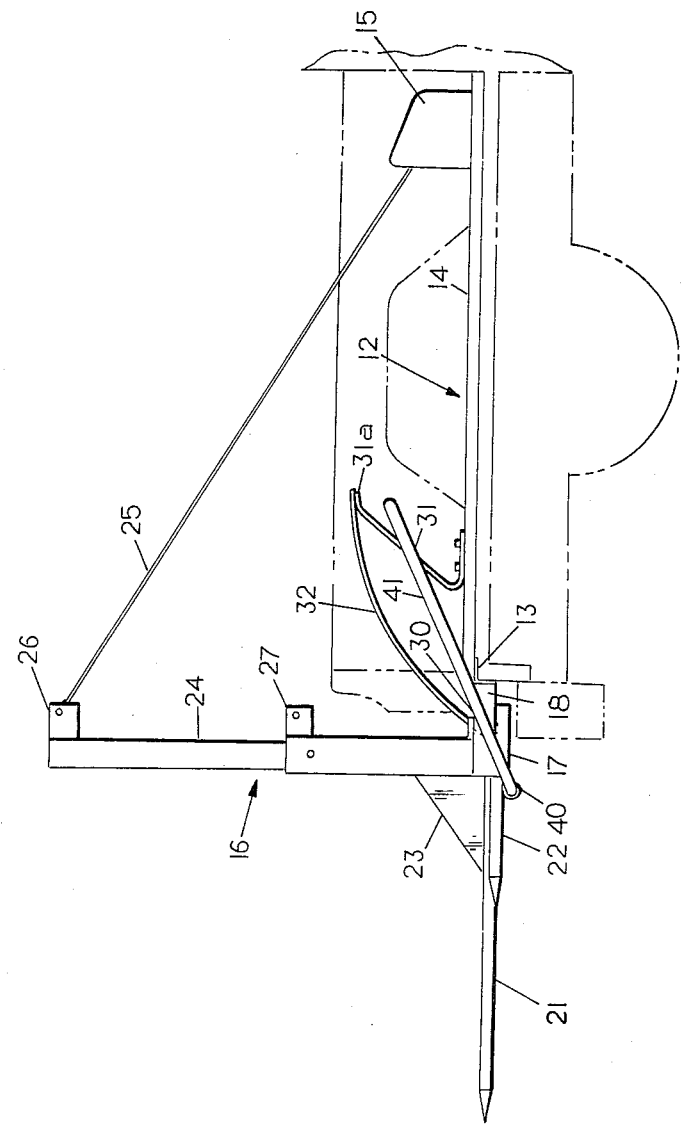

FIG. 2 is a schematic side elevational view of the bale transporting and unrolling mechanism in lowered position for bale pick-up.

Figure 3:
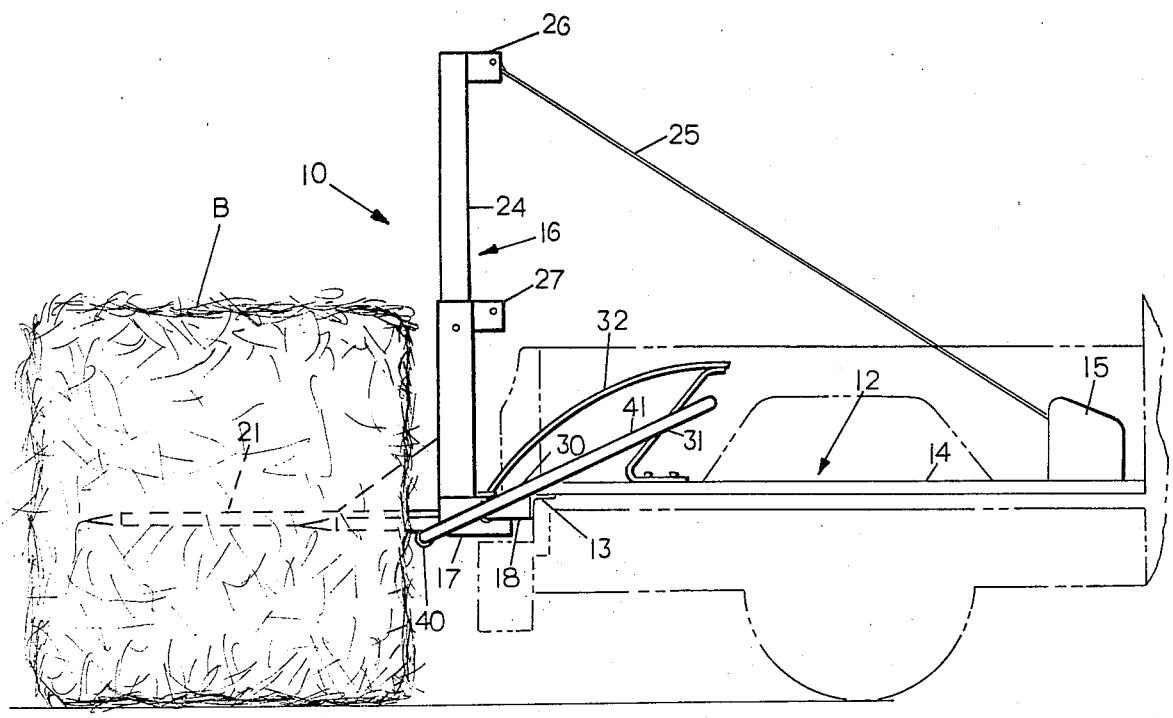

FIG. 3 is a view similar to FIG. 2 with the transporting and unrolling mechanism inserted into the bale for pick-up and transport.

Figure 4:
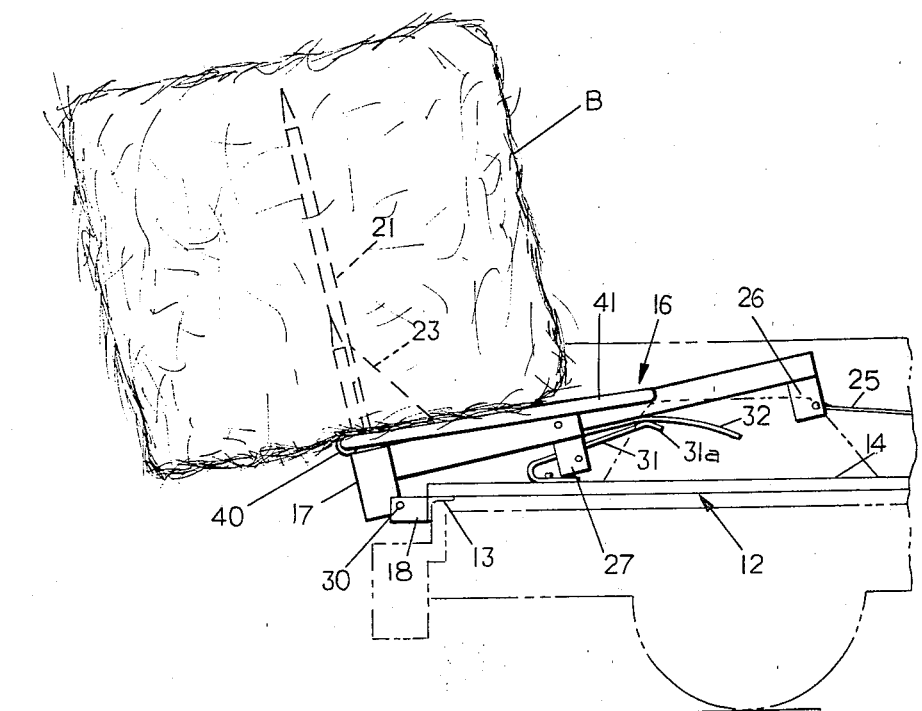

FIG. 4 is a schematic view similar to FIG. 3 showing the bale transporting and unrolling mechanism in raised position for transporting the bale.

FIG. 5 is a schematic view similar to FIGS. 3 and 4 showing the bale transporting and unrolling mechanism in unrolling position following its delivery to an unrolling site.

FIG. 6 is a perspective view of the pair of U-shaped arms of the bale transporting and unrolling mechanism employed in the latter operation.

Figure 7:
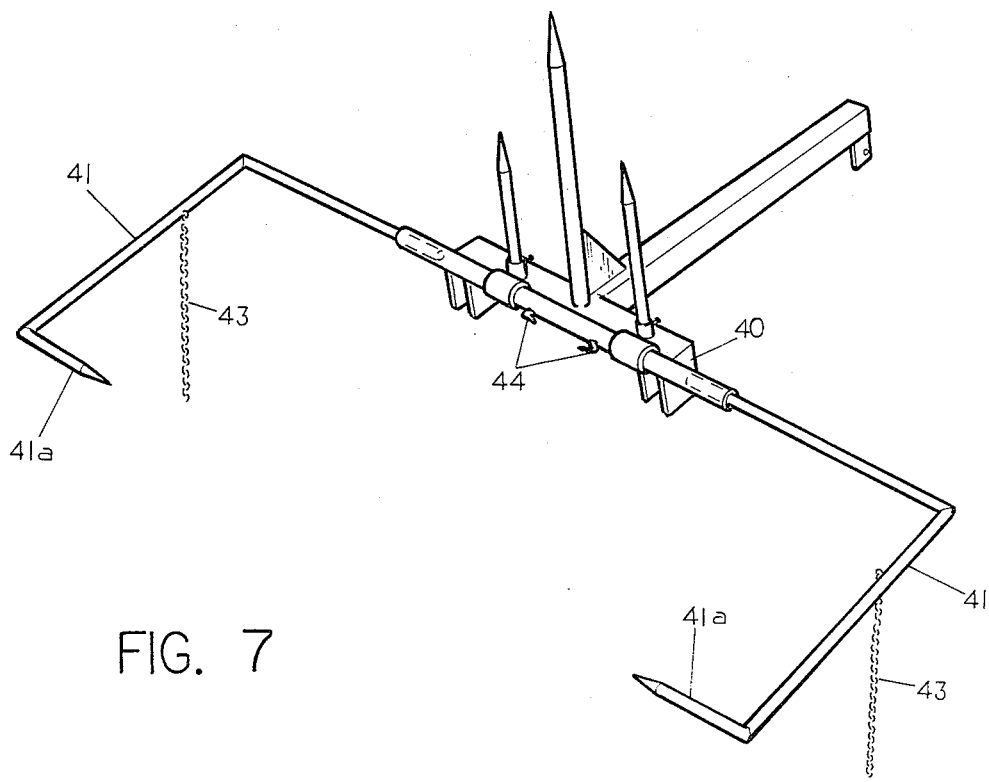

FIG. 7 is a further enlarged perspective view of the pair of U-shaped arms shown in FIG. 6 in the bale pre-engaging position.

Figure 8:
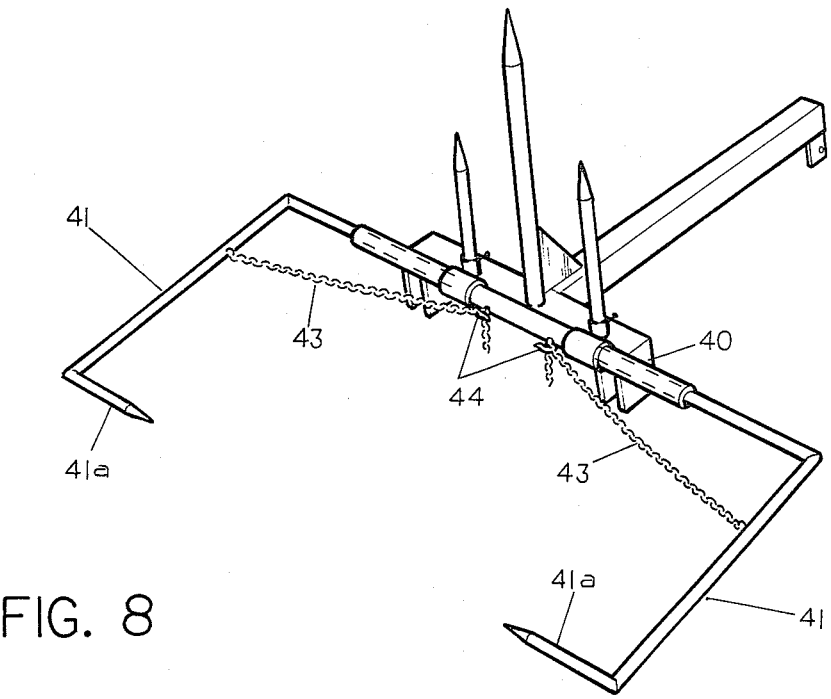

FIG. 8 is a view similar to FIG. 7 showing the pair of U-shaped arms in the bale engaging position for the unrolling operation.

DESCRIPTION OF PREFERRED EMBODIMENT

The bale handling and unrolling mechanism of this invention for use on pick-up trucks is referred to generally in FIG. 1 by the reference numeral 10. The mechanism is provided with an elongated finger support member 16 which is pivotally mounted on a base frame assembly 12. The base member is preferably T-shaped and mounted with a rearward cross-member portion 13 located adjacent the rearward end of the truck bed. The cross-member 13 may be comprised of an angle iron fitted over the rear edge of the truck bed, and may include a tubular member 40 which is generally coextensive therewith. An electric winch 15 is mounted on a forward portion of the base member adapted to pivotally raise and lower the finger support member 16. Alternately, a hydraulically-operated winch may be employed to operate the cable to move the finger support member.

As stated, the base member 12 is preferably T-shaped in cross-section with its central member 14 located horizontally in the center of the truck bed with its cross-member 13 near the rearward extremity of the truck bed. The cross-member is rigidly mounted on the truck bed in permanent relation on the flat horizontal plane of the bed. Bolts may be employed for securing the base member to the floor of the pick-up truck, or alternately, it may be welded thereto.

The finger support member 16 is T-shaped in cross-section and includes a cross-member 17 which is pivotally mounted to the cross-member 13 of the base assembly 12. The base cross-member 13 has a slightly greater length than the cross-member 17 of the finger support structure. The cross-member 17 is pivotally mounted on the base cross-member 13 on a pair of suitable pin members journaled within pairs of lugs 18 attached to the base cross-member 13 and projecting rearwardly.

The cross-member 17 of the finger support structure 16 is employed to support a plurality of three elongated finger members 20, 21 and 22 disposed in horizontal lineal array when lowered. The central finger 21 is substantially longer than the next adjacent outer pair of fingers 20 and 22 having similar shorter lengths. The elongated cantilevered fingers having relatively pointed free-end portions are adapted to penetrate the bale when positioned horizontally and the truck is backed into close proximity with the bale located on the ground or other surface. Central longer finger 21 has a triangular gusset plate 23 attached to the central arm member 24 of the pivotal finger support structure 16 to provide additional lifting strength to this longer projecting finger or spike. The fingers are aligned in a single plane, preferably horizontally when lowered, to penetrate the bale at or near its axial center plane, and facilitate its lifting and transport without rotation, even if penetrated and supported off-center. FIG. 2 shows the fingers in horizontal bale penetrating relation while FIG. 3 shows the fingers after bale penetration. Obviously, the bale B may be much greater in relative size and diameter than that shown in FIGS. 3 and 4.

Finger support member 16 which is T-shaped and movable about pivot point 30 has a central arm member 24 which extends in lineal alignment with base central member 14. The free end of flexible lifting cable 25 is firmly attached to the projecting free end of arm member 24 at a block 26. A stop member 27 may be attached to a medial region of central arm member 24, if desired. Central arm member 24 extends vertically when fingers 20, 21 and 22 extend horizontally, these several elements being disposed in right-angle relation on finger support member 16.

A pair of leaf springs 31 and 32 is mounted in lineal alignment between central arm members 14 and 24 of the base assembly and finger support member, respectively. Leaf spring 31 has one end permanently fastened to the central member 14 of the base assembly and is doubled back on itself with its free end projecting upwardly and forwardly. Its free end has an angled flattened portion 31a adapted to contact with other leaf spring 32. Spring 32 is mounted having one end within a suitable channel at the lower end of central arm member 24 adjacent its pivot point 30. Spring 32 is arcuately curved with its free end projecting forwardly and upwardly to be contacted on its underside by the flattened end portion 31a of spring 31. The two springs 31 and 32, in combination with the weight of T-shaped finger support, are able to maintain continuous tension on the flexible cable 25 between loads and at all times when loading and unloading the bale. The springs, each having one end attached and the other freely cantilevered, are maintained in sliding contact with each other when the fingers and the supported bale B are raised as shown in FIGS. 3 and 4. The finger support member 16 can be raised to a near vertical position as shown in FIG. 4 to a position where optional stop member 27 makes contact with the top surface of central member 14 on the truck bed. At this time, the lifting cable 25 is maintaining a direct pull on arm member 24 in nearly an axial direction. Leaf spring 32 has its attached end portion located within a suitable channel at the lower end of central arm member 24. The spring may have a circular end portion mounted on a suitable pivot pin (not shown). Such mounting assists in keeping the two leaf springs in coaxial face-to-face contacting alignment for developing the continuous tension. The two leaf springs are so contoured that, in combination with the weight of the T-shaped finger support member, they are able to exert positive and continuous tension on the flexible lifting cable, whether the lifting fingers are loaded or unloaded, and when the finger support member is moved both upwardly and downwardly.

In operation, the truck is driven to the location of the bale and the elongated finger support member 16 is pivotally lowered to a rearwardly and horizontally-extending position where the pointed end of finger 21 is positioned on the axial center of the hay bale. No difficulty is experienced in lowering the fingers with the continuous tension maintained on the lifting cable. The truck is then backed further towards the bale permitting the fingers to fully penetrate the bale until it engages the cross-member 17. The winch 15 is then operated to raise fingers 20, 21 and 22 by pivotal movement of finger support member 16 by the flexible cable. The bale when raised may then be transported to another location supported by the fingers and the truck bed sides. When it is desired to unload the bale after transport, the winch is again operated to lower finger support member 16 pivotally so that the bale again contacts the ground or other surface. The truck may then be driven away leaving the bale in place. The finger support member 16 may be readily raised and subsequently again lowered with full control over the support cable and finger elevation due to the continuously maintained tension.

A pair of U-shaped arm members 41 is mounted adjacent the pivot point of the T-shaped finger support member. Each arm member 41 has one leg portion telescoped within tubular member 40, the supported leg portions facing each other from the outbound ends of the tubular member 40. The free leg portions of the arm members 41 have pointed tips 41a which are adapted to penetrate the bale. The base portion of each U-shaped arm member 41 has a length slightly greater than the radius of the largest bale to be handled and unrolled. The arms are both pivotally and telescopically mounted within tubular member 40. The arms are capable of being pivoted through an angle of about 180° from their horizontal operative position to their nearly-horizontal stored position within the truck bed.

FIG. 1 shows in perspective how the U-shaped arms 41 are stowed within the truck bed during the bale pick-up, transport and delivery operations to a feeding site. FIG. 4 shows the bale being transported to such site. After the bale is delivered to the feeding site, the elongated fingers 20, 21 and 22 are moved from the bale B and raised to their elevated position, and the truck is moved to a right angle position so that the pair of U-shaped arms 40 can be rotated through about 180° from their stowed position on the truck bed to their operating position penetrating the bale axis. FIG. 5 shows the arms inserted within the bale ready for unrolling. FIG. 7 shows the pair of arms extended from their bale engagement position from which arrangement each is pushed into the bale axially from opposite sides. Each of the U-shaped arms 41 has its free-end leg portion 41a disposed with respect to base portion 41b at an angle slightly greater than a right angle, an angle of about 95° being preferred. Further, each arm 41 has its mounting leg portion 41c disposed with respect to base portion 41b at an angle slightly lesser than a right angle, an angle of about 85° being preferred. Such angularity helps to positively maintain the free legs within the bale during its unrolling, and is shown in FIG. 6. A locking chain 43 is attached to each arm 41 which is able to be connected to a locking pin 44 mounted on tubular member 40 after the free ends of the arm penetrate the bale. This arrangement is shown in FIG. 5 so that the bale can be progressively rolled over the ground and unrolled starting with its outermost free end. All or only part of the bale can be unrolled as desired, the bale cut or dissected at a desired region, and the remainder can be transported and unrolled at another site as aforesaid. The U-shaped arms 41 are retained within the bale B on its central axis during the unrolling operation by the pair of locking chains 43. When the bale is fully unrolled, the arms 41 are again stowed within the truck bed after being telescoped within tube 40.

Obviously, the subject apparatus can be used only for conveying the bale from one location to another when no unrolling is desired. It can desirably be used only for unrolling the bale, in part or in full, at an existing bale location, or can expeditiously perform both operations, as desired or required, as set forth hereinabove.

Various modifications may be resorted to within the spirit and scope of the appended claims.

I claim:

1. A combination bale handling and unrolling mechanism adapted to mounting on the bed portion of a pick-up truck, or the like, comprising a base member attached to said truck bed portion, a T-shaped finger support member having its cross-member pivotally mounted adjacent the rearward end of said base member and said truck bed portion, a plurality of elongated finger members attached to and projecting rearwardly from the said pivotally-mounted cross-member in its lowered position adapted to penetrate and support the bale, cable means connected to the free end portion of the central member of said T-shaped finger support member, winch means mounted on said base member spaced from said pivotal T-shaped finger support member and connected to the other end of said cable means adapted to raise and lower the finger-supported bale, spring means mounted between the said pivotal T-shaped finger support member and said base member adapted to maintain continuous tension on said cable means, and a pair of U-shaped arm members each having one leg portion telescopically and pivotally mounted parallel and adjacent to the cross-member of T-shaped finger support member, each arm having a pointed tip on its other free leg portion adapted to penetrate the bale center, the base portion of each U-shaped arm member having a greater dimension than the bale radius for its unrolling on forward movement of said bale handling and unrolling mechanism, whereby said pivotally-mounted T-shaped finger support member is adapted to operate through essentially a right-angle between its lowered and raised positions and said pair of U-shaped arm members is adapted to operate through essentially about 180° between their operative and stored positions.

2. The combination bale handling and unrolling mechanism set forth in claim 1, wherein said spring means comprises at least two leaf springs mounted in face-to-face contacting relation, one of said leaf springs being arcuately shaped to maintain continuous tension on said cable means in combination with said other leaf spring and the weight of the T-shaped finger support member.

3. The combination bale handling and unrolling mechanism set forth in claim 1, wherein said pair of U-shaped arm members are similarly dimensioned with each having one leg portion coaxially mounted telescopically within a hollow tubular member disposed adjacent the juncture area of said pivotal T-shaped finger support member.

4. The combination bale handling and unrolling mechanism set forth in claim 3, including retention means attached to each U-shaped arm member to retain the other free-leg portion of both arm members in positive penetrating engagement with the bale during the unrolling operation.

5. The combination bale handling and unrolling mechanism set forth in claim 1, wherein said spring means comprises a pair of leaf springs mounted in lineal alignment with the central member of said pivotal T-shaped finger support member, one leaf spring being attached adjacent the juncture area of said pivotal T-shaped finger support member and the other attached to said base member, said pair of leaf springs being coaxially aligned in face-to-face contacting relation.

6. The combination bale handling and unrolling mechanism set forth in claim 1, wherein said winch means comprises a cable drum and electric motor adapted to operate said cable drum.

7. The combination bale handling and unrolling mechanism set forth in claim 1, wherein said plurality of elongated finger members comprises at least three bale-penetrating fingers having pointed tip portions mounted in horizontal parallel array in their lowered position.

8. The combination bale handling and unrolling mechanism set forth in claim 1, wherein said cable means comprises a flexible steel cable connected to the central arm member of said T-shaped finger support member and said winch means mounted on said base member.

9. The combination bale handling and unrolling mechanism set forth in claim 2, wherein one end of said arcuately-shaped leaf spring is attached to said pivotal T-shaped finger support member, said arcuate leaf spring having a quadrantal curved shape to encompass substantially a 90° quadrant.

10. The combination bale handling and unrolling mechanism set forth in claim 1, wherein said spring means comprises a pair of axially-aligned springs having free-end portions mounted in face-to-face contacting relation, one leaf spring being arcuate with one end attached centrally adjacent said T-shaped finger support member, and the other leaf spring attached to said base member with a flattened free-end portion adapted to slidingly engage with said arcuately-shaped leaf spring during loaded and unloaded movement of said pivotal T-shaped finger support member for combinedly maintaining continuous tension on said cable means.

11. A combination bale handling and unrolling mechanism adapted to mounting on the bed portion of a pick-up truck, or the like, comprising
a base member attached to the said truck bed portion,
a T-shaped finger support member having its cross-member pivotally mounted adjacent the rearward end of said base member and transversely to said truck bed portion,
a plurality of elongated finger members attached to and projecting rearwardly from the said pivotally-mounted cross-member in its lowered position adapted to penetrate and support the bale,
cable means connected to the free-end portion of the central arm member of said T-shaped finger support member and a forward portion of said base member,
an electrically-powered winch mounted on the forward portion of said base member having a cable drum adapted to retain the operative end of said cable means,
a pair of leaf springs mounted in slidable face-to-face contacting relation, one of said leaf springs being arcuately-shaped and the other having a flat free end portion for engagement with the former to combinedly maintain continuous tension on said cable means for its uniform retention on and release from said cable drum,
an electrical power source adapted to operate said winch, and
a pair of individual U-shaped arm members each having one leg portion pivotally mounted parallel and adjacent to the cross-member of said T-shaped finger support member, each arm having a pointed tip on its other free-leg portion adapted to penetrate the bale center, the base portion of each U-shaped arm member having a greater dimension than the bale radius for its unrolling on forward movement of said bale handling and unrolling mechanism,
whereby said pivotally-mounted T-shaped finger support member is adapted to operate through essentially a right-angle between its lowered and raised positions and said pair of U-shaped arm members is adapted to operate through essentially about 180° between their operative and stored positions.

12. The combination bale handling and unrolling mechanism set forth in claim 11, wherein said pair of individual U-shaped arm members are similarly dimensioned with each having one leg portion coaxially mounted telescopically within a hollow tubular member disposed adjacent the juncture area of said pivotal T-shaped finger support member.

13. The combination bale handling and unrolling mechanism set forth in claim 11, including retention means attached to each U-shaped arm member to retain the other free leg portion in positive penetrating engagement with the bale during the unrolling operation.

14. The combination bale handling and unrolling mechanism set forth in claim 11, wherein said spring means comprises a pair of leaf springs mounted in lineal alignment with the central member of said pivotal T-shaped finger support member, one leaf spring being attached adjacent the juncture area of said pivotal T-shaped finger support member and the other attached to said base member, said pair of leaf springs being coaxially aligned in face-to-face contacting relation.

15. The combination bale handling and unrolling mechanism set forth in claim 11, wherein the plurality of elongated finger members are adapted to axially penetrate a round bale for its pick-up and transport, and the free leg portions of said pair of individual U-shaped arm members are adapted to axially penetrate the said round bale when deposited on the ground and in a 90° position from the deposited position.

* * * * *